US006639712B2

(12) United States Patent
McBride et al.

(10) Patent No.: US 6,639,712 B2
(45) Date of Patent: Oct. 28, 2003

(54) METHOD AND APPARATUS FOR CONFIGURING AND TUNING CRYSTALS TO CONTROL ELECTROMAGNETIC RADIATION (75) Inventors: Sterling Eduard McBride, Princeton, NJ (US); Peter J. Zanzucchi, Princeton Junction, NJ (US); Joseph Hy Abeles, East Brunswick, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/116,651

(22) Filed: Apr. 3, 2002

(65) Prior Publication Data

US 2002/0167714 A1 Nov. 14, 2002

Related U.S. Application Data (60) Provisional application No. 60/284,806, filed on Apr. 19, 2001, and provisional application No. 60/281,180, filed on Apr. 3, 2001.

(51) Int. Cl.⁷ .............................. G02B 6/20; G02F 1/01
(52) U.S. Cl. ...................... 359/298; 359/241; 359/302
(58) Field of Search ............................... 359/298, 241, 359/240, 302; 385/125, 126

(56) References Cited

U.S. PATENT DOCUMENTS

| 6,130,969 A | 10/2000 | Villeneuve et al. .......... 385/27 |
| 2002/0051275 A1 * | 5/2002 | Tokushima ................. 359/241 |
| 2002/0071646 A1 * | 6/2002 | Eggleton et al. ............ 385/125 |

OTHER PUBLICATIONS

B. Nelson et al., "Use of a dielectric stack as a one–dimensional photonic crystal for wavelength demultiplexing by beam shifting", Optics Letters, vol. 25, No. 20, Oct. 15, 2000.

M. Loncar, T. Doll et al., "Design and Fabrication of Silicon Photonic Crystal Optical Waveguides", Journal of Lighwave Technology, vol. 18, No. 10, Oct. 2000 p. 1402–1411.

M. Bayindir et al., "Photonic–crystal–based beam splitters", Applied Physics Letters, vol. 77, No. 24, Dec. 11, 2000, p. 3902–3904.

M. Tokushima et al., "Lightwave propagation through a 120° sharply bent single–line–defect photonic crystal waveguide", Applied Physics Letters, vol. 76, No. 8, Feb. 21, 2000, p. 952–954.

J. Yonekura et al., "Analysis of Finite 2–D Photonic Crystals of Columns and Lightwave Devices Using the Scattering Matrix Method", Journal of Lightwave Technology, vol. 17, No. 8, Aug. 1999, p. 1500–1508.

G. Tayeb et al., "Rigorous tehoretical study of finite–size two–dimensional photonic crystals doped by microcavities", J. Opt. Soc. of America, vol. 14, No. 12, Dec. 1997, p. 3323–3332.

(List continued on next page.)

*Primary Examiner*—Scott J. Sugarman
*Assistant Examiner*—Richard Hanig
(74) *Attorney, Agent, or Firm*—William J. Burke (57) ABSTRACT A method and apparatus for configuring and tuning a crystal by selectively controlling a fluid supplied to a plurality of nodes within a substrate. The apparatus comprises a substrate having at least one node that can be selectively supplied with a liquid that will change the material property of the node. The node may be a spherical cavity in a three-dimensional structure, a cylindrical aperture in two-dimensional structure, or a cavity in a one-dimensional structure. The node or nodes in the substrate are coupled to a fluid distribution assembly that selectively alters the material property of the nodes. The material property may be changed by moving the fluid or material in a fluid, using electrohydrodynamic pumping, electroosmotic pumping, electrophoresis, thermocapillarity, electrowetting or electrocapillarity. The change in the material property in at least one of the nodes changes the electromagnetic radiation filtering or switching characteristics of the crystal.

26 Claims, 5 Drawing Sheets

OTHER PUBLICATIONS

M. Pollack et al., "Electrowetting–based actuation of liquid droplets for microfluidic applications", Applied Physics Letters, vol. 77, No. 11, Sep. 2000, pp. 1725–1726.

M.W.J. Prins et al., "Fluid Control in Multichannel Structures by Electrocapillary Pressure", Science, vol. 291, Jan. 2001, pp. 277–280.

H. Kosako et al., "Superprism Phenomena in Photonic Crystals: Toward Microscale Lightwave Circuits", Journ. of Lightwave Technology, vol. 17, No. 11, Nov. 1999, p. 2032–2038.

H–B Lin, "Two–Dimensional photonic bandgap optical limiter in the visible", Optics Letters, vol. 23, No. 2, Jan. 1998, p. 94–96.

H–B Lin et al., "Observation of two–dimensional photonic band bahavior in the visible", Applied Physics Lett. 68 (21) May 20, 1996, pp. 2927–2929.

A. Rosenberg et al., "Photonic band–structure effects in the visible and near ultraviolet observed in solild–state dielectric arrays", Appl. Phys. Letter 69 (18), Oct. 1996, p. 2638–2640.

J. Shirk, "Protecting the War Fighter's Vision in a Laser–Rich, Battlefield Environment", Optics & Photonics News, Apr. 2000, pp. 19–23.

B. Gralak et al., "Anomalous refractive properties of photonic crystals", J. Optical Society of America, vol. 17, No. 6, Jun. 2000, pp. 1012–1020.

S. McBride et al., "Electrohydrodynamic Pumps for High–Density Microfluidic Arrays", Proceedings of the Micro TAS 98 Workshop, Canada, Oct. 1998, pp. 45–48.

* cited by examiner

METHOD AND APPARATUS FOR CONFIGURING AND TUNING CRYSTALS TO CONTROL ELECTROMAGNETIC RADIATION

CROSS-REFERENCE TO RELATED APPLICATIONS

This application claims benefit of U.S. provisional patent application Ser. No. 60/281,180, filed Apr. 3, 2001 and application serial No. 60/284,806, filed Apr. 19, 2001 which are herein incorporated by reference.

BACKGROUND OF THE INVENTION

1. Field of the Invention

The present invention generally relates to electromagnetic radiation control devices. More specifically, the present invention relates to a method and apparatus for configuring and tuning crystals for switching and filtering of electromagnetic radiation.

2. Description of the Related Art

In communications systems using optical multiplexing such as dense wavelength, division multiplexing (DWDM), wavelength division multiplexing (WDM), time division multiplexing (TDM) and the like, the distribution of optical information is facilitated by the use of components such as fiber optic gratings, interferometers, various types of filters and the like. Traditional optical components, which are fabricated in plastic, semiconductor, or glass, are largely fixed in their optical properties by their rigid, essentially permanent structures. Thus, in this context, the distribution of optical information is also fixed and the service provider is unable to change the configuration of the DWDM, WDM or TDM format, e.g., distribution, without physically changing the communications system.

One type of photonic crystal known in the art comprises a glass or semiconductor substrate having a plurality of cylindrical apertures formed therethrough in a pattern. Some or all of the cylindrical apertures, such as pillars can be filled with a material having a refractive index different from the refractive index of the substrate.

As light is injected into one end of the substrate, the light interacts with the pillars. The light, as it propagates through the crystal, will be split into multiple paths that constructively and deconstructively interfere with one another to effectively filter the light as it passes through the crystal. For example, a particular bandwidth of light propagates through the filter and other wavelengths of light are either reflected or absorbed within the crystal structure. Generally, the spacing of the pillars and their refractive indices defines a filter that reflects a certain bandwidth of wavelengths of light. The pillars may be filled with gas, fluid or solid materials having various refractive indices. Crystal structures of this type are formed for a specific use and filter a specific wavelength of light and are not reconfigurable in a selective manner. As such, the crystals are used in applications where a fixed filter is necessary or desired.

Therefore there is a need in the art for a method and apparatus for configuring and tuning a photonic crystal.

SUMMARY OF THE INVENTION

The present invention is a method and apparatus for configuring and tuning a crystal by selectively controlling a fluid supplied to a plurality of nodes formed in a substrate. The apparatus comprises a substrate having at least one node that can be selectively supplied with a fluid that changes a material property of the node. The material property may include refractive index, magnetic permeability, inducible refractive index, absorption and the like. The node may be a spherical cavity in a three-dimensional structure, a cylindrical aperture in a two-dimensional structure, or a cavity in a one-dimensional structure. The node or nodes within the substrate are coupled to a fluid distribution assembly that selectively alters the material property of the node(s). The material property may be changed by moving the fluid, or a material in a fluid, using electrohydrodynamic pumping, electroosmotic pumping, electrophoresis, thermocapillarity, electrowetting or electrocapillarity. Such crystal structures can be used to switch or filter electromagnetic radiation such as light or microwaves.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
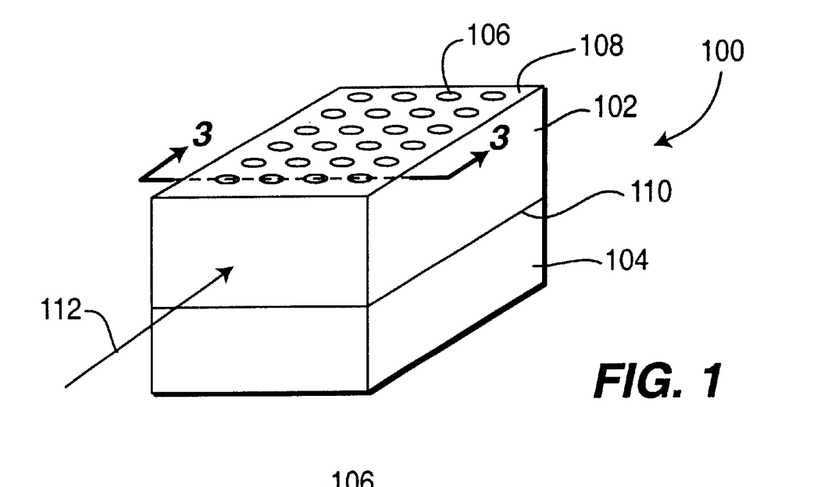
FIG. 1 is a perspective view of one embodiment of the present invention.

FIG. 1 depicts a perspective view of a first embodiment of the present invention comprising a configurable crystal 100. The configurable crystal 100 comprises a substrate 102 and a fluid distribution assembly 104. The substrate 102 comprises a plurality of cylindrical apertures 106 that are referred to herein as pillars 106. The pillars are formed as cylindrical apertures that extend through the substrate 102 from the top surface 108 to the bottom surface 110 thereof. The substrate 102 may be formed of glass, silicon, gallium-arsenide, various III–V semiconductor materials, and the like. In essence, any transmissive material that transmits a particular wavelength of interest. The apertures 106 are generally formed by etching the substrate 102. In one alternative embodiment, a plurality of glass tubes are fused into a bundle and the bundle is heated and linearly drawn. As the bundle is drawn, the holes in the tubes shrink to form the apertures 106. The apertures have a sub-micron diameter, e.g., 0.75 μm. To refract the light and have a filtering effect, the pillars 106 are arranged in a two-dimensional array having typically about 5 rows and 10 columns of apertures or more. As is known in the prior art, the pillars form a Brillouin zone that generally requires 2 or 3 rows of pillars. The zone is defined by the geometry of the pillars in the substrate.

Light (or other electromagnet radiation) is generally incident upon the substrate 102 as represented by arrow 112. As shall be described below, the configuration of the pillars and the material property thereof cause the incident light to be refracted and filtered as it propagates through the substrate. Alternatively, the specific arrangement of material properties within the pillars may cause the incident light to be directed out of the crystal at a particular angle or location along the substrate. The material property of each of the pillars 106 is reversibly controlled by the fluid distribution assembly 104. The material properties may include refractive index, magnetic permeability, inducible refractive index, absorption and the like.

Figure 2:
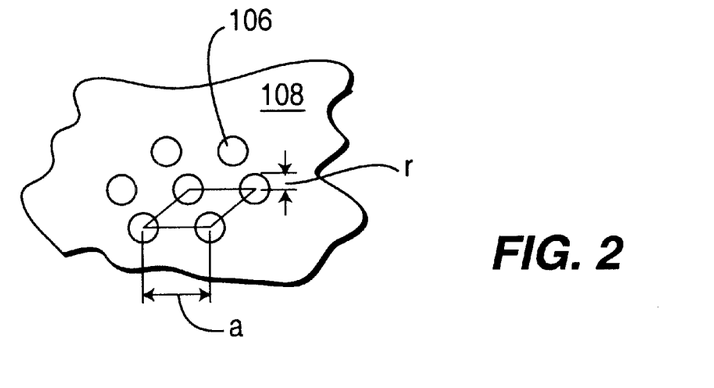
FIG. 2 is a top plan view of the configurable photonic crystal structure of FIG. 1.

FIG. 2 is a top plan view of the surface 108 of the configurable crystal 100 of FIG. 1. The pillars have a radius r on the order of 0.5 μm–0.8 μm and a spacing a of less than a micron for optical wavelengths. The radius and spacing and the two dimensional arrangement of the pillars establishes a nominal function of the crystal, i.e., whether the crystal is a filter or a director of the light path (a switching function). To facilitate a reversible control of the filtering function or switching function, the pillars are filled (or emptied) with a material having, for example, a particular refractive index. In accordance with one embodiment of the present invention, the refractive index of any one or more of the pillars is alterable. Computer models are available to aid in the design of the photonic crystal, where the radius, spacing, array arrangement, and refractive index are variables within the model. The model can be used to compute specific filter characteristics depending upon the variables. The modeling will identify specific nodes of the crystal structure and the refractive index of those nodes that will produce certain characteristics for the crystal. The fluid distribution assembly 104 can then be used to alter the refractive index in the specified nodes to produce a physical crystal that corresponds to the crystal structure model.

Figure 3:
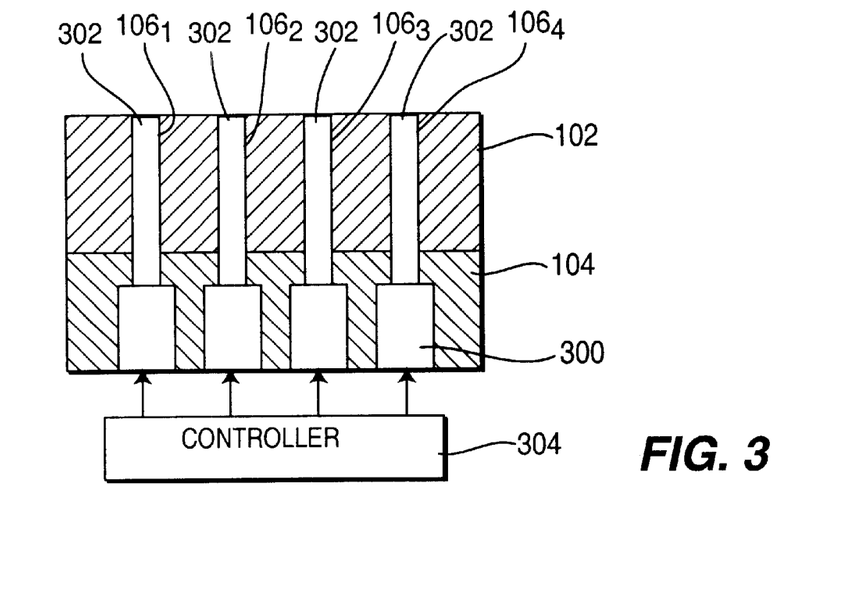
FIG. 3 is a cross section view of the configurable photonic crystal taken along line 3—3 of FIG. 1.

FIG. 3 depicts a cross sectional view of the configurable crystal 100 taken along line 3—3 of FIG. 1. The substrate 102 contains a plurality of nodes $106_1$, $106_2$, $106_3$, and $106_4$ that are each filled with a first material 302 having a specific refractive index. This material may be a fluid, a material of suitable index in a fluid, or a gas such as air. In some embodiments of the invention, the fluid 302 may have a refractive index that substantially matches the refractive index of the substrate 102. The fluid 302 is provided and maintained within the pillars 106 by pumps 300 that are controlled by a controller 304. The controller 304 supplies electrical voltages to the individual pumps 300 to facilitate movement of fluid into and out of the pillars 106. The pumps may be electrohydrodynamic pumps, electroosmotic pumps, electrophoresis pumps, thermocapillarity pumps, electrowetting pumps and electrocapillarity pumps or a combination thereof. These various types of pumps for moving fluid within a capillary are well know within the art. Generally, they operate by applying a voltage to the pump to move a particular fluid, plug of fluid or component of the fluid from one location in the pillar to another location.

Figure 4:
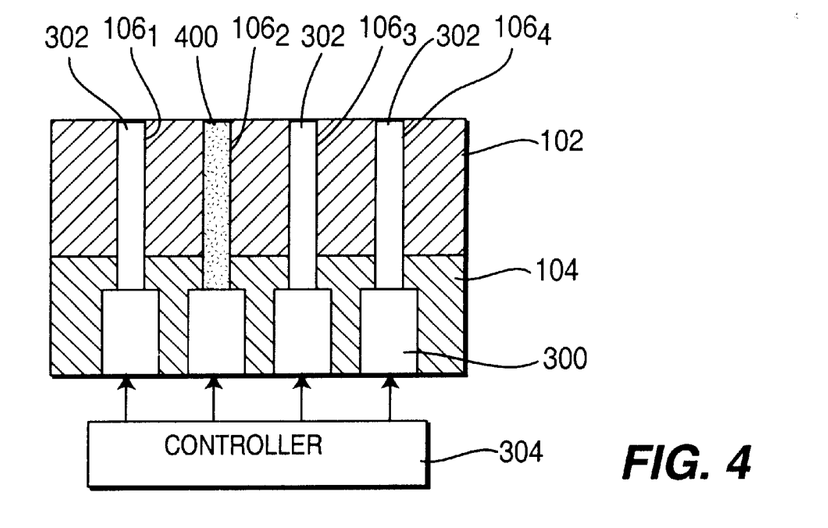
FIG. 4 is cross sectional view of the configurable photonic crystal taken along line 3—3 of FIG. 1 having a refractive index in one node being altered.

FIG. 4 depicts the structure of FIG. 3 having a new fluid 400 pumped into pillar $106_2$. This fluid 400 has a different refractive index than the fluid 302 in pillars $106_1$, $106_3$ and $106_4$. Consequently the crystal structure has been reconfigured to provide a different filtering characteristic or switching characteristic.

Figure 5:
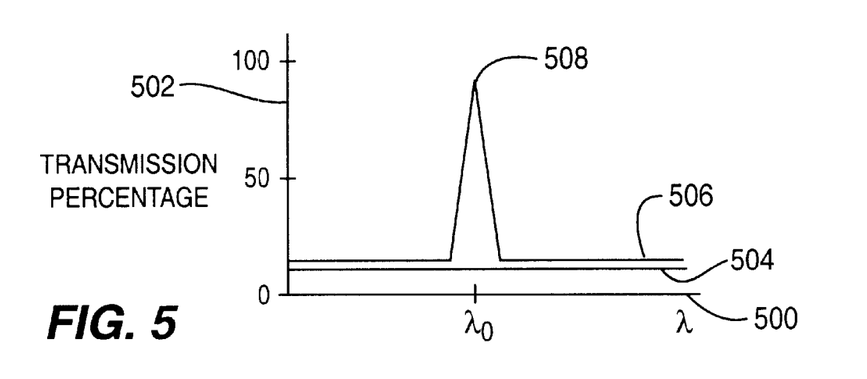
FIG. 5 is a graph of transmission percentage versus wavelength for one embodiment of the invention.

For example, FIG. 5 depicts a graph of a transmission percentage (axis 502) versus wavelength (axis 500) for a photonic structure for a crystal such as that in FIG. 1. In a first state (represented by graph 504), the refractive indices of the pillars are chosen to suppress transmission of light through the crystal due to the band gap structure of the photonic crystal. Upon insertion of a fluid having a different refractive index into one or more pillars, the transmission characteristics of the crystal are changed such that at wavelength $\lambda_0$ light is transmitted by the crystal structure represented by graph 506. The peak transmission occurs at point 508 corresponding to wavelength $\lambda_0$.

Figure 6:
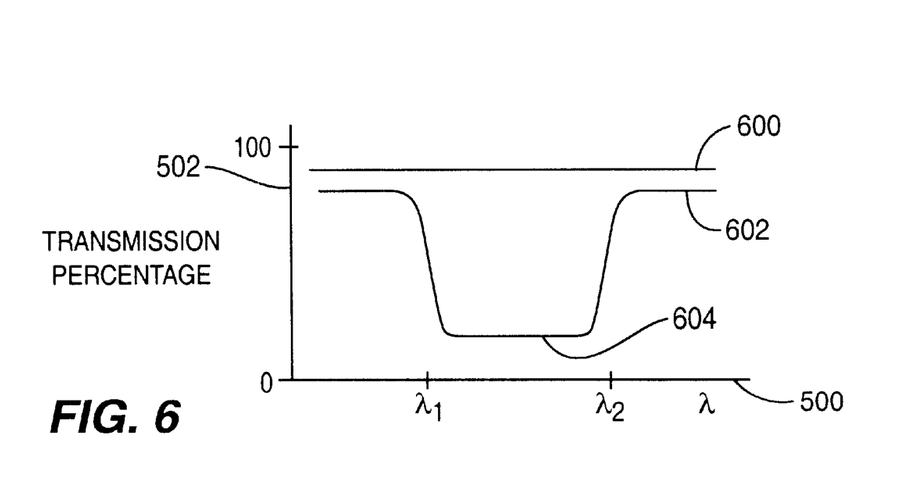
FIG. 6 is a graph of transmission percentage versus wavelength for another embodiment of the invention.

FIG. 6 depicts a graph of transmission percentage versus wavelength for another embodiment of the invention. In this embodiment, the refractive indices are selected to provide a broadband filtering effect where certain ones of the pillars are filled with material that causes the structure to switch from a highly transmissive crystal represented by graph 600 to a crystal having wavelengths between $\lambda_1$ and $\lambda_2$ substantially suppressed. The suppression is due to the band gap structure of the photonic crystal. In some embodiments, the refractive indices of the pillars could be selected such that light within the bandwidth $\lambda_1$ to $\lambda_2$ is directed to a specific output location along the edge of the substrate. In some instances this direction could be at the side of the substrate, when the incident light enters at the front of the substrate, such that the wavelength of interest is output physically ninety degrees from the location the incident light entered the substrate.

Figure 7:
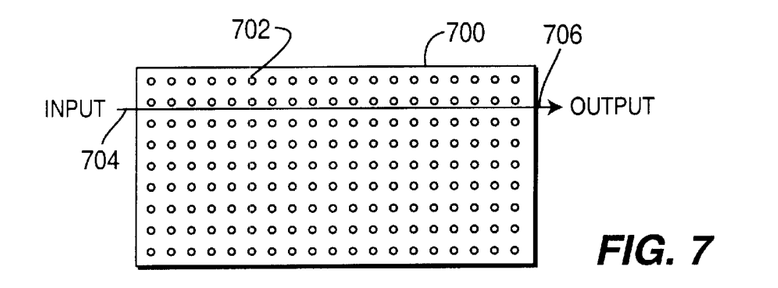
FIG. 7 is a top plan view of another embodiment of the invention.
Figure 8:
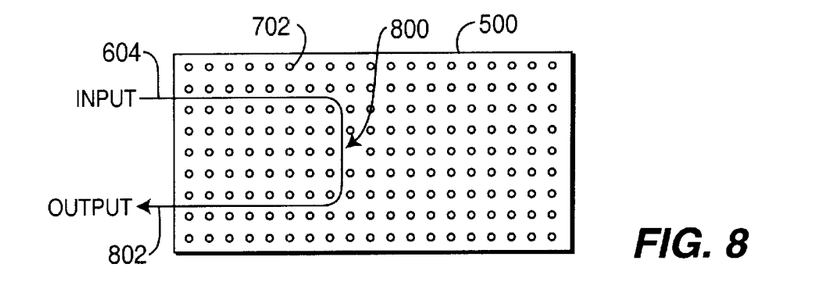
FIG. 8 is a top plan view of the embodiment in FIG. 7 having one node with a changed refractive index in accordance with the present invention.

For example, FIG. 7 depicts a top plan view of at substrate 700 having a two dimensional array of pillars 702. In the first state of this array, light input at location 704 propagates through the substrate to output at location 706. This is generally a direct linear propagation through the substrate. FIG. 8 depicts the array of FIG. 7 having one of the pillars 800 with a changed refractive index. In this case, the changed refractive index causes the pillar 800 to have a refractive index that matches the refractive index of the substrate 700. This change in refractive index causes the light that is input at location 604 to be bent and returned to that same surface that the light entered and output at location 802. As such, this one change has caused the light to be redirected 180°. In practice, the substrate 700 can be used as a switch such that, when the refractive index of pillar 800 is changed, the light will be switched from location 706 to location 802 and vice versa.

Although the foregoing description has described the invention using a two dimensional array of pillars as the control nodes within the crystal structure, the invention can be expanded such that the nodes are arranged in a three dimensional array of spherical cavities that are interconnected by a capillary structure to allow fluid to be pumped into and out of the cavities to change the refractive index of each of the spherical cavities. As such, the crystal structure can be a three dimensional configurable photonic crystal that operates in accordance with the present invention. As such the nodes 702 shown in FIGS. 7 and 8 can be spherical cavities within a three dimensional structure, where the view taken in FIGS. 7 and 8 is cross sectional through a plane containing a plurality of spherical cavities.

Figure 9A:
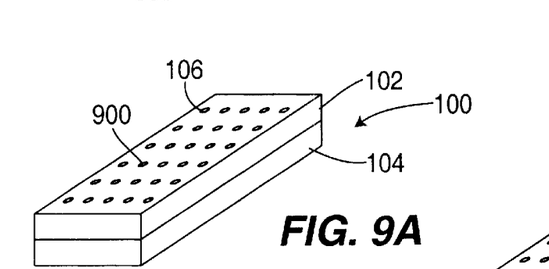
FIGS. 9A, 9B and 9C represent a method of forming a sealed photonic structure.
Figure 9B:
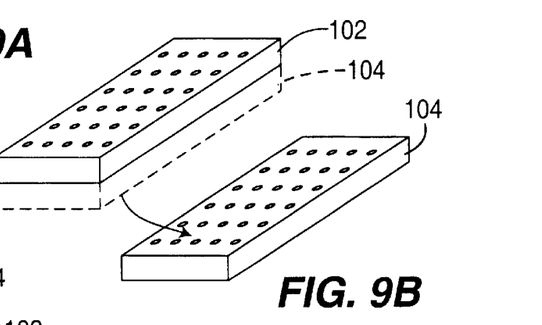
Figure 9C:
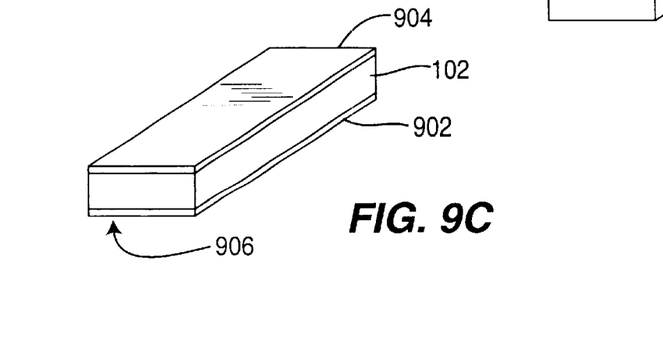

In another embodiment of the invention, the substrate 102 can be configured and then removed from the fluid distribution assembly 104. The substrate 102 is then sealed to provide a fixed photonic crystal structure. FIGS. 9A, 9B and 9C depict a process for creating a sealed photonic crystal structure 906. FIG. 9A depicts a perspective view of the substrate 102 coupled to the fluid distribution assembly 104 such that the nodes 106 are configured to have certain refractive indices. Once configured, some of the nodes 900 have different refractive indices than other nodes. The particular configuration could be determined using a computer model as discussed above and the nodes altered to correspond to the model. Once the array is "programmed", the fluid distribution assembly 104 is removed from the substrate 102 as shown in FIG. 9B. In FIG. 9C, the array is sealed either by complete encapsulation or depositing a top sealing layer 904 and a bottom sealing layer 902 upon the substrate 102 to form the sealed photonic crystal structure 906. The sealing layers 902 and 904 insure that the fluid within the nodes will not be contaminated or drained from the nodes. In this manner, a photonic crystal can be configured using the techniques of the invention and then sealed to provide a crystal structure having a fixed characteristic. As such, photonic crystals of a specified characteristic can be mass-produced using assembly line manufacturing techniques. In another embodiment, the fluid is a material, such as a silicone elastomer (CORNING SYLGART 184, RTV), that polymerizes changing from a fluid to a solid or semi-solid by chemical, temperature or radiation (example: ultra violet radiation) effects. In another embodiment the material polymerizes changing material properties such as refractive index.

Figure 10:
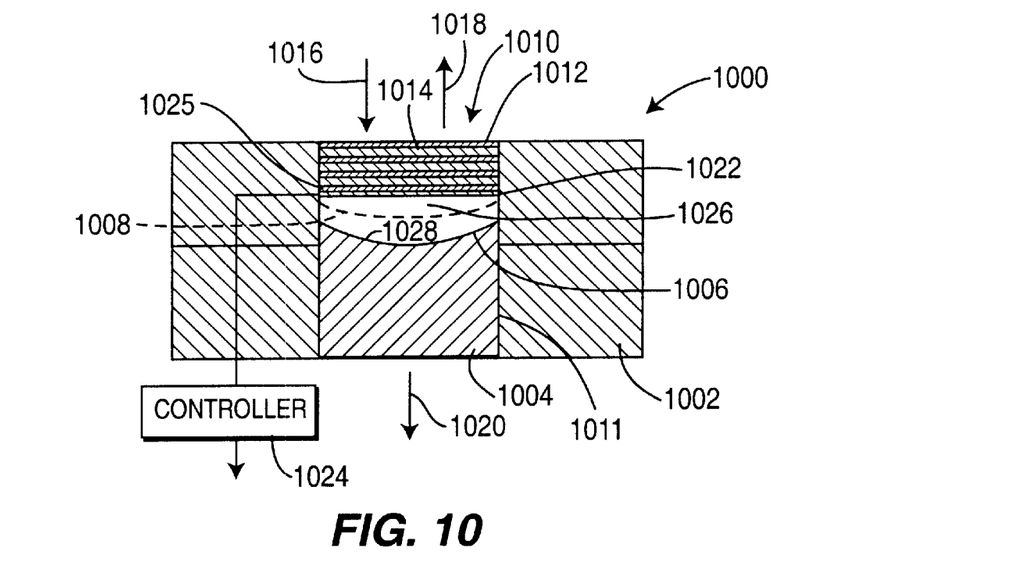
FIG. 10 is a cross sectional view of a one dimensional configurable photonic crystal.

The foregoing discussions have focused upon two-dimensional and three-dimensional arrays of nodes that are configurable through the use of a fluid distribution array 104. The techniques of the invention may also be used in a one-dimensional array. FIG. 10 is a cross sectional view of a one-dimensional array in accordance with the present invention. The structure 1000 comprises a substrate 1002 having a Bragg cell 1010 positioned within a channel or cylindrical cavity 1011. The Bragg cell 1010 comprises alternating material layers 1012 and 1014 having different refractive indices. The layers 1012 and 1014 are structured to provide a nominal bandwidth and frequency selection for transmission and reflection of light from the cell 1010. Light is incident (as represented by arrow 1016) upon the Bragg cell, some of that light is reflected from the cell (as represented by arrow 1018) and some of the light is transmitted (as represented by arrow 1020). A transparent electrode 1022 is formed upon the bottom layer 1025 of the Bragg cell 1010 and coupled to a controller 1024. The channel 1011 is partially filled with a fluid 1004 having a particular refractive index and a surface 1028. Air or some other compressible material is trapped between the surface 1028 and the electrode 1022 to form a region 1026. When voltage is applied to the electrode 1022 by the controller 1024 the fluid 1004 moves. The surface 1028 from location 1006 to a new position at location 1008. As such, the width of the region 1026 is altered such that the characteristics of the structure 1000 are altered to change the nominal frequency operation of the structure. Consequently, the passband frequency is shifted due to the change in the width of region 1026. In effect, the region 1026 and the fluid 1004 form two additional layers of the Bragg cell that are configurable to alter the characteristics of the Bragg cell.

Figure 11A:
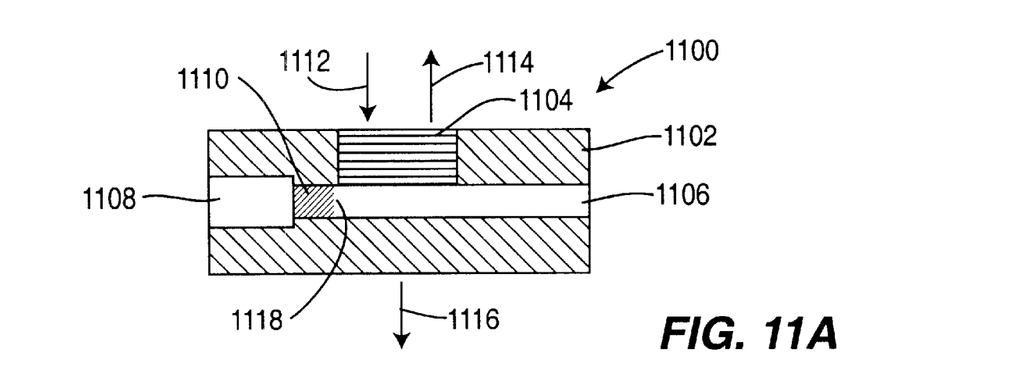
FIGS. 11A and 11B depict another embodiment of the one dimensional configurable photonic crystal;.
Figure 11B:
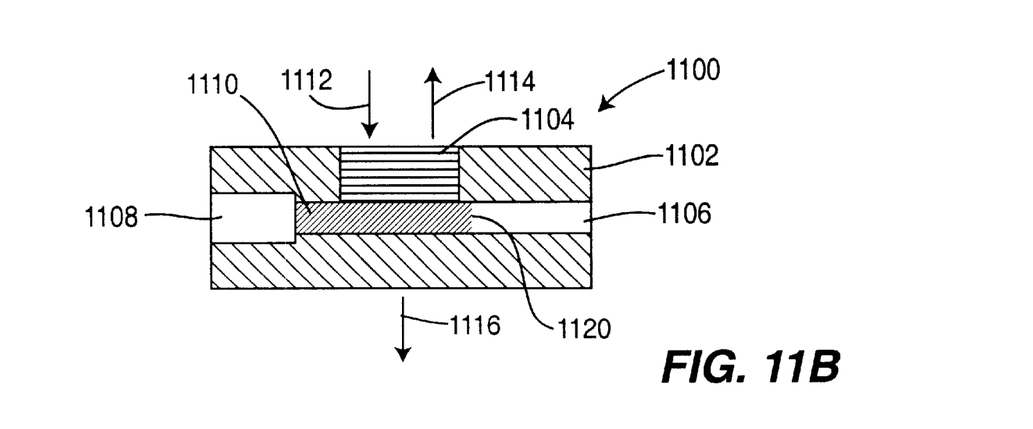

FIGS. 11A and 11B depict a cross section of another embodiment of the one-dimensional structure. FIG. 11A depicts a cross section of a structure 1100 having a substrate 1102 and a laterally directed channel 1106 containing a fluid 1110 coupled to a pump 1108. A Bragg cell 1104 is formed in the substrate 1102 and the bottom layer of the Bragg cell 1104 abuts the channel 1106. In FIG. 11A, the fluid 110 is positioned at location 1118. While the fluid is at position 1118, an incident light (represented by arrow 1112) has a certain percentage of the light reflected from the Bragg cell (as represented by arrow 1114) and a certain percentage transmitted by the Bragg cell (as represented by arrow 1116). The pump 1108 may be an electrohydrodynamic pump, an electroosmotic pump, an electrophoresis pump, a thermocapillarity pump, an electrowetting pump or an electrocapillarity pump. Such pumps are well known in the art. The pump 1108 moves the fluid 1110 into position within channel 1106 beneath the Bragg cell 1104. FIG. 11B depicts the structure 1100 of FIG. 11A having the fluid 1110 moved from location 1118 to location 1120. The fluid 1110 has a different refractive index than the fluid or air that previously was beneath the Bragg cell 1104. As such, with the change in refractive index, the transmission and reflection characteristics of the structure 1100 are changed.

Figure 12:
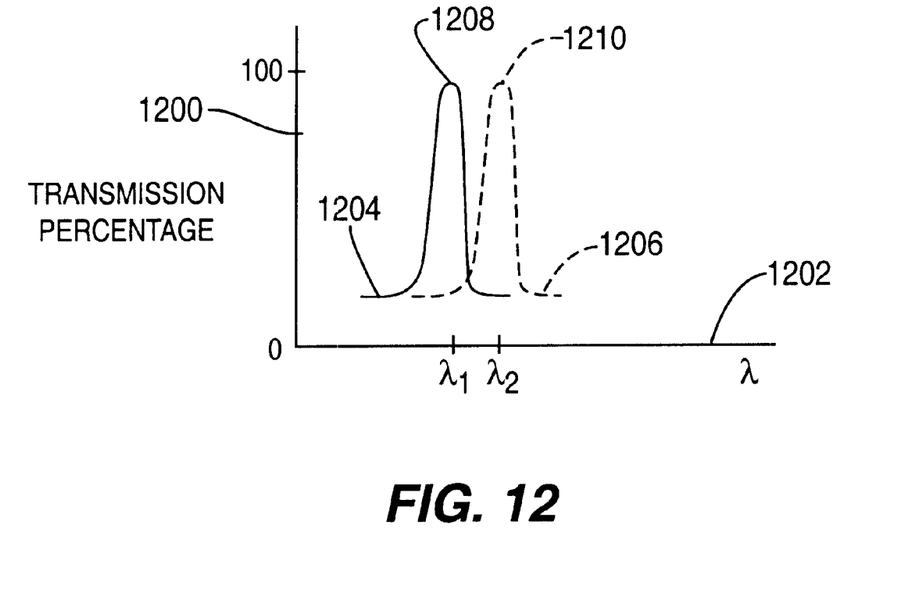
FIG. 12 depicts a transmission percentage versus wavelength graph of the embodiment of FIGS. 11A and 11B.

FIG. 12 depicts a graph of transmission percentage (axis 1200) versus wavelength (axis 1202) for the embodiment of the invention in FIGS. 11A and 11B. For the embodiment in FIG. 11A, the graph 1204 has a peak transmission 1208 at frequency $\lambda_1$. This peak 1208 is altered when the fluid is moved beneath the Bragg cell to form the graph 1206 having a peak 1210 at frequency $\lambda_2$. In effect, movement of the fluid beneath the Bragg cell alters a bottom layer of the Bragg cell enabling the structure to be used as tunable filter or a switch.

Figure 13:
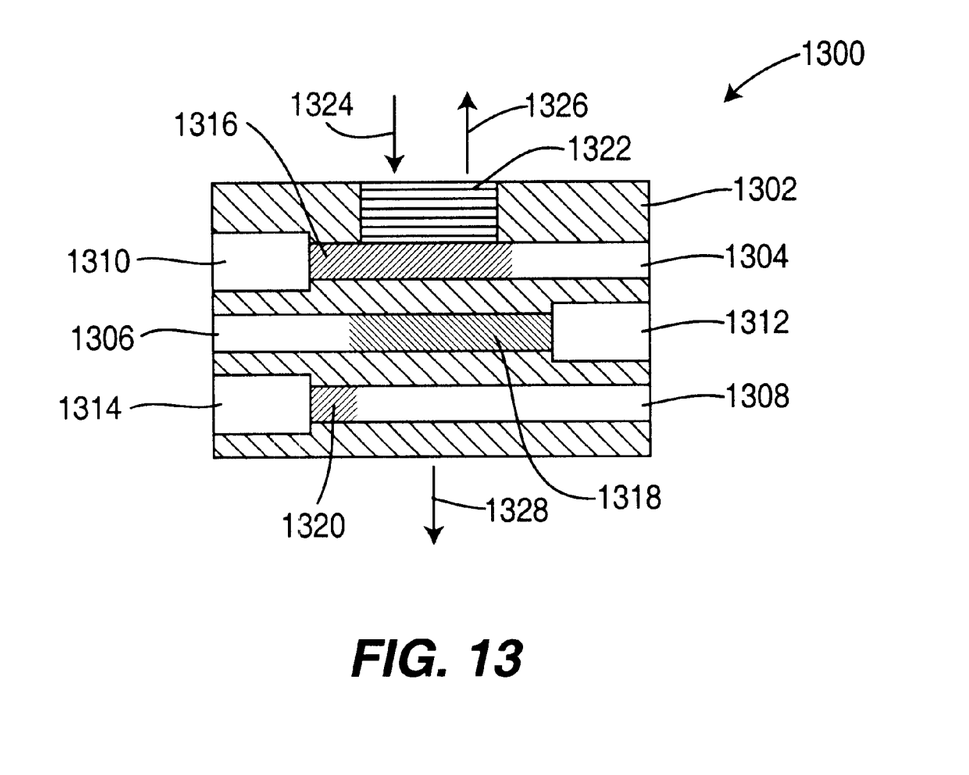
FIG. 13 depicts another embodiment of a one dimensional configurable photonic structure.

FIG. 13 extends the concepts described in relation to FIGS. 10, 11A and 11B to include a multi layer control structure. FIG. 13 depicts a cross section of a one dimensional crystal structure 1300 having a substrate 1302 containing a Bragg cell 1322 and a plurality of fluid nodes embodied as channels 1304, 1306, 1308 that are coupled to pumps 1310, 1312 and 1314. The channels each contain a fluid 1316, 1318 and 1320 that can be selectively moved into or out of the path of light from the Bragg cell to the output of the structure 1300. In this manner, selective positioning of the fluids changes the refractive index in each of the channels to change the filtering characteristics of the structure 1300. Thus, the incident light (arrow 1324) will be reflected (arrow 1326) and transmitted (arrow 1328) for each different combination of fluids. Although three channels are depicted in FIG. 13, those skilled in the art will understand that any number of channels may be used to further control the frequency selectivity and/or bandwidth of the structure 1300.

In addition to the Bragg cells of FIGS. 10, 11 and 13, the fluid structures can be placed between the Bragg cells so there will be a Bragg cell on the top and on the bottom of the fluid channel or channels. In essence, the fluid channels form additional layers of the Bragg cell and such placement merely changes the characteristics of the Bragg cell allowing additional tuning flexibility. Although the foregoing discussion has focused upon the use of the structures for control of light propagation, the structures can also be used for controlling electromagnetic radiation propagation by filling the nodes with magnetic materials such as ferrites, dielectrics, conductors and selectively controlling which nodes have such materials and which do not. Consequently, the application of electromagnetic radiation, such as microwaves, to such a crystal will selectively control the propagation of the radiation through the crystal to form an electromagnetic filter or switch, e.g., a microwave filter or switch. The crystal structure will then operate on the microwaves in the same manner that such a structure operates on light in the prior embodiments.

As discussed above, the configurable photonic crystal can be used as an optical switch or as an optical filter depending on the characteristics of the crystal structure. The configurable photonic device can also be used in such applications as a laser, a laser array, optical filtering and switching devices used in optical multiplexers and other components, variable optical attenuators, variable dispersion compensators, polarization controlling and compensation devices and collimating devices. In essence, the devices of the present invention can be used in any application where configurable photonic characteristics are necessary or desired. Further uses of the invention are as a pixel for a display device where the pixel consists of a tunable photonic structure and the electronic control of its refractive index may be used to create red, green and blue pixels for transmission of a white backlight.

While foregoing is directed to the preferred embodiment of the present invention, other and further embodiments of the invention may be devised without departing from the basic scope thereof, and the scope thereof is determined by the claims that follow.

What is claimed is:

1. Apparatus for controlling electromagnetic radiation, comprising:
    a substrate having at least one node, where said at least one node has a material property; and
    a control assembly, coupled to the at least one node, for applying a fluid to the at least one node to selectively change the material property of said at least one node.

2. The apparatus of claim 1 wherein said nodes are arranged in a one-dimensional array.

3. The apparatus of claim 2 wherein the at least one node in the one-dimensional array comprises:
    at least one cavity containing a fluid; and
    a pump for moving the fluid in the cavity to alter the material property of the cavity.

4. The apparatus of claim 3 wherein the at least one node in the one-dimensional array comprises:
    a Bragg cell positioned proximate the cavity.

5. The apparatus of claim 4 wherein the cavity comprises a fluid and the surface of the fluid and a bottom of the Bragg cell form a region, where a size of the region is altered to change the material property of the at least one node.

6. The apparatus of claim 4 wherein the cavity is a channel having a liquid that is moved out of and in to position proximate the Bragg cell to alter the material property of the at least one node.

7. The apparatus of claim 1 wherein said nodes are arranged in a two-dimensional array.

8. The apparatus of claim 7 wherein the at least one node comprises:
    at least one pillar formed in the substrate;
    a pump coupled to the at least one pillar for supplying a fluid to the at least one pillar to alter the material property of the at least one pillar.

9. The apparatus of claim 1 wherein said nodes are arranged in a three-dimensional array.

10. The apparatus of claim 9 wherein the at least one node comprises:
    at least one spherical cavity formed in the substrate;
    a pump coupled to the at least one spherical cavity for supplying a fluid to the at least one spherical cavity to alter the material property of the at least one spherical cavity.

11. The apparatus of claim 1 further comprising a seal layer encapsulating the substrate.

12. The apparatus of claim 1 wherein the substrate is a photonic crystal structure for controlling the propagation of light.

13. The apparatus of claim 1 wherein the substrate is fabricated of a material selected from a group comprising: glass, ceramic, or semiconductor.

14. The apparatus of claim 1 wherein the material property is at least one of a refractive index, a magnetic permeability, an inducible refractive index, and absorption.

15. The apparatus of claim 1 wherein the fluid is an elastomer that polymerizes within the substrate.

16. The apparatus of claim 15 wherein the fluid, once polymerized, changes the material property of the at least one node.

17. The apparatus of claim 1 wherein the control assembly comprises a pump selected from a group of pumps including a electrohydrodynamic pump, a electroosmotic pump, electrophoresis pump, a thermocapillarity pump, a electrowetting pump and a electrocapillarity pump.

18. A method of configuring a photonic crystal comprising:
    coupling a fluid distribution assembly to a substrate having a plurality of nodes; and
    supplying fluid having a specific material property to selected nodes, whereby the substrate functions as a photonic crystal.

19. The method of claim 18 further comprising:
    detaching the liquid distribution assembly from the substrate; and
    applying a sealant to the substrate.

20. The method of claim 18 wherein the material property is at least one of a refractive index, a magnetic permeability, an inducible refractive index, and absorption.

21. The apparatus of claim 18 wherein the fluid is an elastomer that polymerizes within the substrate.

22. The apparatus of claim 21 wherein the fluid, once polymerized, changes the material property of the at least one node.

23. The apparatus of claim 18 wherein the supplying step comprises pumping using a pump selected from a group of pumps including a electrohydrodynamic pump, a electroosmotic pump, electrophoresis pump, a thermocapillarity pump, a electrowetting pump and a electrocapillarity pump.

24. A method of configuring a crystal having a substrate and at least one node formed in the substrate, comprising:
    pumping a fluid in or out of the at least one node to alter a material property of the at least one node; and
    applying electromagnetic radiation to the crystal to switch or filter the electromagnetic radiation.

25. The method of claim 24 wherein the electromagnetic radiation comprises microwaves or light.

26. The method of claim 24 wherein said pumping step comprises:
    applying a control voltage to at least one pump selected from a group of pumps including a electrohydrodynamic pump, a electroosmotic pump, electrophoresis pump, a thermocapillarity pump, a electrowetting pump and a electrocapillarity pump.

* * * * *